UNITED STATES PATENT OFFICE.

G. R. SPANNAGEL, OF ST. LOUIS, MISSOURI.

IMPROVED COMPOSITION FOR PREVENTING INCRUSTATION IN BOILERS.

Specification forming part of Letters Patent No. 49,931, dated September 12, 1865.

*To all whom it may concern:*

Be it known that I, GUST. R. SPANNAGEL, of St. Louis, in the county of St. Louis, in the State of Missouri, have invented a new and Improved Mode of Preventing the Deposit of the Carbonate of Lime in the Steam-Boilers and in the Pipes in Connection with Same; and I do hereby declare that the following is a full and exact description thereof.

The nature of my invention consists in providing the water which is to be used in steam-boilers with a composition of matters which will clear it of the carbonate of lime and gypsum before it comes to the steam-boiler.

To enable others skilled in the art to make or use my invention, I will proceed to describe and specify its composition and operation.

The composition consists of the following matters: thirty parts of proto chloride of iron, thirty parts of murias strontia, fifteen parts of barito murias, fifteen parts of acetate of protoxide of iron, five parts of terra japonica, three parts of ammoniac murias, two parts of brown sugar.

The water, before it is used in the steam-boiler, will be brought in a reservoir. When in this reservoir the water will be provided with the composition at the rate of one pound in as much water as will be required for an engine of one hundred horse-power during the time of twelve hours. Before the composition is put in the water it ought to be pulverized.

What I claim as my invention, and desire to secure by Letters Patent, is—

The composition of matters, as above described, for the purpose set forth.

GUS R. SPANNAGEL.

Witnesses:
ERNEST WITTE,
JOHN PETERSEN.